US008024405B2

(12) United States Patent
Shukla et al.

(10) Patent No.: US 8,024,405 B2
(45) Date of Patent: Sep. 20, 2011

(54) DECLARATIVE MODEL FOR CONCURRENCY-CONTROL ACROSS LIGHTWEIGHT THREADS

(75) Inventors: Dharma Shukla, Sammamish, WA (US); Bob Schmidt, Woodinville, WA (US); Akash J. Sagar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1088 days.

(21) Appl. No.: 11/393,966

(22) Filed: Mar. 30, 2006

(65) Prior Publication Data
US 2007/0233969 A1  Oct. 4, 2007

(51) Int. Cl.
*G06F 15/16* (2006.01)
(52) U.S. Cl. ........ 709/205; 709/201; 709/202; 709/203; 709/214
(58) Field of Classification Search ............ 709/205
See application file for complete search history.

(56) References Cited

U.S. PATENT DOCUMENTS

| | | | |
|---|---|---|---|
| 5,287,537 A | 2/1994 | Newmark et al. | |
| 5,301,320 A | 4/1994 | McAtee et al. | |
| 5,555,388 A * | 9/1996 | Shaughnessy | 711/100 |
| 5,634,127 A | 5/1997 | Cloud et al. | |
| 5,734,837 A | 3/1998 | Flores et al. | |
| 5,774,661 A | 6/1998 | Chatterjee et al. | |
| 5,930,512 A | 7/1999 | Boden et al. | |
| 6,016,394 A | 1/2000 | Walker | |
| 6,028,997 A | 2/2000 | Leymann et al. | |
| 6,073,109 A | 6/2000 | Flores et al. | |
| 6,078,982 A * | 6/2000 | Du et al. | 710/200 |
| 6,115,646 A | 9/2000 | Fiszman et al. | |
| 6,148,325 A | 11/2000 | Schmidt et al. | |
| 6,158,044 A | 12/2000 | Tibbetts | |
| 6,225,998 B1 | 5/2001 | Okita et al. | |
| 6,240,440 B1 * | 5/2001 | Kutcher | 718/102 |

(Continued)

FOREIGN PATENT DOCUMENTS
EP    0953929 A2   11/1999
(Continued)

OTHER PUBLICATIONS

Maurer, Frank et al., Merging Project Planning and Web-Enabled Dynamic Workflow Technologies, IEEE Internet Computing, Jun. 2000, pp. 65-74, XP002345613, ISSN: 1089-7801, IEEE Service Center, Piscataway, NJ, US.

(Continued)

*Primary Examiner* — Dohm Chankong
*Assistant Examiner* — Neeraj Utreja
(74) *Attorney, Agent, or Firm* — Senniger Powers LLP

(57) ABSTRACT

Implementing synchronization among threads in a workflow. A memory area stores a plurality of work items in a scheduler queue. The work items are associated with an activity in the workflow, and each work item is associated with a thread. A processor is configured to assign a synchronization handle to each of the work items. The synchronization handle indicates a particular shared resource to be accessed by the work items. A token value is computed for each work item based on the assigned synchronization handle and the work items in a hierarchy in the activity. The work items are sorted in a synchronization queue based on the token value associated with each work item. The processor sequentially executes each of the sorted work items in the synchronization queue to serialize the access to the particular shared resource and effects a synchronous execution of the threads associated with the work items.

16 Claims, 10 Drawing Sheets

U.S. PATENT DOCUMENTS

| | | |
|---|---|---|
| 6,253,369 B1 | 6/2001 | Cloud et al. |
| 6,397,192 B1 | 5/2002 | Notani et al. |
| 6,405,364 B1 | 6/2002 | Bowman-Amuah |
| 6,567,783 B1 | 5/2003 | Notani et al. |
| 6,604,104 B1 | 8/2003 | Smith |
| 6,622,155 B1 | 9/2003 | Haddon et al. |
| 6,658,490 B1 | 12/2003 | Williams et al. |
| 6,678,882 B1 | 1/2004 | Hurley et al. |
| 6,807,583 B2 | 10/2004 | Hrischuk et al. |
| 6,845,507 B2 | 1/2005 | Kenton |
| 6,862,635 B1 | 3/2005 | Alverson et al. |
| 6,889,231 B1 | 5/2005 | Souder et al. |
| 6,898,604 B1 | 5/2005 | Ballinger et al. |
| 6,918,053 B1 | 7/2005 | Thatte et al. |
| 6,964,034 B1 | 11/2005 | Snow |
| 6,971,084 B2 | 11/2005 | Grey et al. |
| 6,971,096 B1 | 11/2005 | Ankireddipally et al. |
| 6,985,939 B2 | 1/2006 | Fletcher et al. |
| 7,069,536 B2 | 6/2006 | Yaung |
| 7,096,454 B2 | 8/2006 | Damm et al. |
| 7,133,833 B1 | 11/2006 | Chone et al. |
| 7,222,334 B2 | 5/2007 | Casati et al. |
| 7,240,324 B2 | 7/2007 | Casati et al. |
| 7,272,816 B2 | 9/2007 | Schulz et al. |
| 7,467,198 B2 | 12/2008 | Goodman et al. |
| 2002/0032692 A1 | 3/2002 | Suzuki et al. |
| 2002/0040312 A1 | 4/2002 | Dhar et al. |
| 2002/0065701 A1 | 5/2002 | Kim et al. |
| 2002/0147606 A1 | 10/2002 | Hoffmann et al. |
| 2002/0170035 A1 | 11/2002 | Casati et al. |
| 2002/0184610 A1 | 12/2002 | Chong et al. |
| 2002/0188644 A1 | 12/2002 | Seidman |
| 2003/0004771 A1 | 1/2003 | Yaung |
| 2003/0018508 A1 | 1/2003 | Schwanke |
| 2003/0033191 A1 | 2/2003 | Davis |
| 2003/0055668 A1 | 3/2003 | Saran et al. |
| 2003/0084016 A1 | 5/2003 | Norgaard et al. |
| 2003/0135659 A1 | 7/2003 | Bellotti et al. |
| 2003/0144891 A1 | 7/2003 | Leymann et al. |
| 2003/0145035 A1 | 7/2003 | De Bonet |
| 2003/0177046 A1 | 9/2003 | Socha-Leialoha |
| 2003/0181991 A1 | 9/2003 | Chau et al. |
| 2003/0195762 A1 | 10/2003 | Gleason et al. |
| 2003/0200527 A1 | 10/2003 | Lynn |
| 2003/0217053 A1 | 11/2003 | Bachman et al. |
| 2003/0220707 A1 | 11/2003 | Budinger et al. |
| 2003/0233374 A1 | 12/2003 | Spinola |
| 2004/0078105 A1 | 4/2004 | Moon et al. |
| 2004/0078373 A1 | 4/2004 | Ghoneimy et al. |
| 2004/0078778 A1 | 4/2004 | Leymann et al. |
| 2004/0148213 A1 | 7/2004 | Aziz et al. |
| 2004/0148214 A1 | 7/2004 | Aziz et al. |
| 2004/0153350 A1 | 8/2004 | Kim et al. |
| 2004/0162741 A1 | 8/2004 | Flaxer et al. |
| 2004/0168155 A1 | 8/2004 | O'Farrell |
| 2004/0221261 A1 | 11/2004 | Blevins |
| 2005/0027585 A1 | 2/2005 | Wodtke et al. |
| 2005/0034098 A1 | 2/2005 | DeSchryver et al. |
| 2005/0071209 A1 | 3/2005 | Tatavu et al. |
| 2005/0132252 A1* | 6/2005 | Fifer et al. ............ 714/15 |
| 2005/0149908 A1 | 7/2005 | Klianev |
| 2005/0177820 A1 | 8/2005 | Mei et al. |
| 2005/0182773 A1 | 8/2005 | Feinsmith |
| 2005/0193286 A1 | 9/2005 | Thatte et al. |
| 2005/0193427 A1 | 9/2005 | John |
| 2005/0204333 A1 | 9/2005 | Denby et al. |
| 2005/0273782 A1 | 12/2005 | Shpeisman et al. |
| 2006/0020446 A1 | 1/2006 | Hamby et al. |
| 2006/0031844 A1 | 2/2006 | Dice et al. |
| 2006/0059253 A1 | 3/2006 | Goodman et al. |
| 2006/0064335 A1 | 3/2006 | Goldszmidt et al. |
| 2006/0074734 A1 | 4/2006 | Shukla et al. |
| 2006/0074735 A1 | 4/2006 | Shukla et al. |
| 2006/0074736 A1 | 4/2006 | Shukla et al. |
| 2006/0112122 A1 | 5/2006 | Goldszmidt et al. |
| 2006/0206863 A1 | 9/2006 | Shenfield et al. |
| 2006/0225032 A1 | 10/2006 | Klerk et al. |
| 2006/0236304 A1 | 10/2006 | Luo et al. |
| 2006/0271927 A1 | 11/2006 | Morales et al. |
| 2008/0320486 A1 | 12/2008 | Bose et al. |

FOREIGN PATENT DOCUMENTS

| | | |
|---|---|---|
| EP | 1238688 A | 9/2002 |
| JP | 2006215713 A | 8/2006 |
| WO | 0054202 A | 9/2000 |
| WO | 2005033933 A1 | 4/2005 |

OTHER PUBLICATIONS

Abhay Parasnis, Session Code: DAT321—Datay Systems—BizTalk Orchestration Engine Futures, Microsoft Professional Developers Conference 2003, Online!, Oct. 27, 2003-Oct. 30, 2003, pp. 1-26, XP002360567, Los Angles, CA, USA http://only4gurus.com/v3/downloadcount.asp?id=421>, retrieved on Dec. 21, 2005.

Marshak R T, IBM's Flowmark Object-Oriented Workflow for Mission-Critical Applications, Workgroup Computing Report, May 1, 1994, pp. 3-13, vol. 17, No. 5, XP00056899, ISSN: 1057-8889.

Buhr, Peter A., et al, "The μ System: Providing Light-Weight Concurrency on Shared-Memory Multiprocessor Computers Running UNIX", Software—Practice and Experience, vol. 20, No. 9, pp. 929-963, 1990, CA.

Holyer, Ian et al., "Distribution in a Demand Driven Style", Department of Computer Science, University of Bristol, http://www.cs.bris.ac.uk/Publications/Papers/1000294.pdf, Aug. 25, 1998, 13 pages, University of Bristol, UK.

Collet, Raphael, "Laziness and Declarative Concurrency", Universite Catholique de Louvain, http://www.info.ucl.ac.be/'raph/papers/lazydecl.ps.gz, May 7, 2004, 6 pages, Universite of Catholique de Louvain, Belgium.

Chen, Chiun-Shiu, et al., "Integrated Support to Improve Inter-thread Communication and Synchronization in a Multithreaded Processor", http://ieeexplore.ieee.org/xpl/abs_free.jsp?arNumber=590359, 1994, 6 pages, IEEE, USA.

Powell, M.L. et al., "SunOS Multi-thread Architecture", http://pasta.union.edu/'terescoj/csc135_w99/sunos_mt_arch.pdf, Winter 1991, 14 pages, USENIX, USA.

Author Unknown, "Windows Workflow Foundation Web: The Official Microsoft Windows Workflow Site, WinFX Windows Workflow Foundation", http://www.windowsworkflow.net/default.aspx?tabindex=0&tabid=1, printed Mar. 1, 2006, 4 pages, Microsoft Corporation, USA.

Blake,"Coordinating Multiple Agents for Workflow-oriented Process Orchestration," Springer-Verlag, 2003, pp. 387-404.

Anonymous, "Open Source Workflow Engines in Java," available at http://web.archive.org/web/20051214041940/http://java-source.net/open-source/workflow-engines>, Dec. 14, 2005, 6 pages.

Wikipedia, "Saved Game," available at http://en.wikipedia.org/w/index.php?title=Saved_game&oldid=42574026>, Mar. 7, 2006, 4 pages.

Goff et al., "Object Serialization and Decimalization using XML," Apr. 2001, CERN, Switzerland, pp. 1-14.

ISO/IEC, "Document Schema Definition Languages (DSDL)—Part 4: Namespace-based Validation Dispatching Language—NVDL," May 2004, available at http://dsdl.org, pp. i-vi, 1-45.

Box, D., et al., "Simplify Development With the Declarative Model of Windows Workflow Foundation", MSDN Magazine, [Online], Jan. 2006, pp. 1-10, XP-002524524, retrieved from the Internet: URL:http://msdn.microsoft.com/en-us/magazine/cc163661.aspx>.

Taulty, M., "WF: Exceptions", Internet Article, [Online], Mar. 13, 2006, XP-002524741, retrieved from the Internet: URL:http://download.microsoft.com/download/c/1/9/c19a65d7-6c83-47c3-9969-7b038baf04c5/WF_Exceptions.zip>.

Taulty, M., "Mike Taulty's Blog—Windows Workflow Foundation Videos", Internet Article, [Online], Mar. 31, 2006, pp. 1-5, XP-002524526, retrieved from the Internet: URL:http://mtaulty.com/communityserver/blogs/mike_taultys_blog/archive/2006/03/31/5806.aspx>.

Anonymous, "Screencasts by Mike Taulty", Internet Article, [Online], Apr. 21, 2009, pp. 1-8, XP-002524527, retrieved from the Internet: URL:http://www.microsoft.com/uk/msdn/screencasts/presenter/11/mike-taulty.aspx?.

Taulty, M., "WF: Cancel Handlers", Internet Article, [Online], Mar. 21, 2006, XP-002524525, retrieved from the Internet: URL:http://download.microsoft.com/download/b/b/e/bbe7bc51-bb78-4510-9540-46e46929129d/WF_Cancellation.zip>.

Notification of Transmittal of the International Search Report and the Written Opinion of the International Searching Authority in International Application No. PCT/US2007/004633, dated Aug. 7, 2007, 7 pages.

Kuczun et al., "Network Design: Tasks & Tools", in proceedings of the conference on Designing interactive systems, 1997, pp. 215-222.

Kumar et al., "Dynamic Routing and Operational Controls in Workflow Management Systems", Management Science, vol. 45, No. 2, Feb. 1999, pp. 253-272. Retrieved Sep. 25, 2009, from ABI/INFORM Global.

Fahringer et al., "A-GWL: Abstract Grid Workflow Language", May 12, 2004; Computational Science—ICCS 2004; [Lecture Notes in Computer Science; LNCS]; Springer-Verlag, Berlin/Heidelberg, pp. 42-49.

Santoro et al., "Learning to Plan the Collaborative Design Process"; Jan. 1, 2005; Computer Supported Cooperative Work in Design Lecture Notes in Computer Science; LNCS, Springer, Berlin, DE, pp. 33-44.

Supplementary European Search Report for Application No. 07751399.2, dated Apr. 13, 2010, 7 pgs.

* cited by examiner

DECLARATIVE MODEL FOR CONCURRENCY-CONTROL ACROSS LIGHTWEIGHT THREADS

BACKGROUND

Process-oriented or process-centric programs have evolved to enable processing of complex instructions modeling real-world interactions between autonomous agents. Existing systems attempt to map business problems to high-level workflows by modeling the business problem. However, real world workflows vary in a variety of dimensions such as (a) execution and modeling complexity, (b) knowledge of the structure of the flow at design time, (c) statically defined or ad-hoc/dynamic, (d) ease of authoring and editing the flow at various points in its lifecycle, and (e) weak or strong association of business logic with the core workflow process. Existing models fail to accommodate all these factors.

Further, most existing workflow models are based on either language-based approaches (e.g., BPEL4WS, XLANG/S, and WSFL) or application based approaches. Language based approaches are high-level workflow languages with a closed set of pre-defined constructs which help model the workflow process to the user/programmer. The workflow languages carry all of the semantic information for the closed set of constructs to enable the user to build a workflow model. However, the languages are not extensible by the developers and represent a closed set of primitives that constitute the workflow model. The languages are tied to the language compiler shipped by the workflow system vendor. Only the workflow system product vendor may extend the model by extending the language with a new set of constructs in a future version of the product. This often requires upgrading the compiler associated with the language. In addition, the languages usually do not declaratively expose or define functions or operations that can be readily and efficiently used by other programs.

Application based approaches are applications which have the workflow capabilities within the application to solve a domain specific problem. These applications are not truly extensible nor do they have a programmable model.

In addition, with the existing approaches, the issues of complexity, foreknowledge, dynamic workflows, authoring ease, and strength of associations with business logic and core workflows are not adequately addressed. There are no extensible, customizable, and re-hostable workflow designer frameworks, available to build visual workflow designers to model different classes of workflows. Existing systems lack a rapid application development (RAD) style workflow design experience which allows users to graphically design the workflow process and associate the business logic in a programming language of developer's choice.

Also, workflow processes deal with cross cutting orthogonal and tangled concerns that span multiple steps of a workflow process model. For example, while parts of the workflow process are designed to participate in long running transactions, other parts of the same process are designed for concurrent execution or for accessing a shared resource. Due to design shortcomings, existing systems fail to provide interleaving of execution threads which enable users to design synchronous or interleaved execution of activities. Still other portions of the same workflow process require tracking, while other portions handle business or application level exceptions. There is a need to apply certain behaviors to one or more portions of a workflow process.

Some workflow modeling approaches are impractical as they require a complete flow-based description of an entire business process including all exceptions and human interventions. Some of these approaches provide additional functionality as exceptions arise, while other approaches exclusively employ a constraint-based approach instead of a flow-based approach to modeling a business process. Existing systems implement either the flow-based or constraint-based approach. Such systems are too inflexible to model many common business situations. These systems also lack the capability to asynchronously handle exceptions or cancellations.

SUMMARY

Embodiments of the invention synchronously execute work items accessing a shared resource using a synchronization handle for an execution thread. With an efficient concurrency control across lightweight threads, aspects of the invention use the synchronization handle to identify the shared resource such that the execution thread for the work item is enabled to access the shared resource without interfering accesses by other threads associated with other work items.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

Appendix A illustrates a set of operations SynchronizationScope showing an exemplary implementation of synchronization or interleaving of shared state across threads in a declarative manner.

Appendix B illustrates an exemplary set of steps of synchronization of thread execution according to the activity hierarchy.

DETAILED DESCRIPTION

Figure 1:
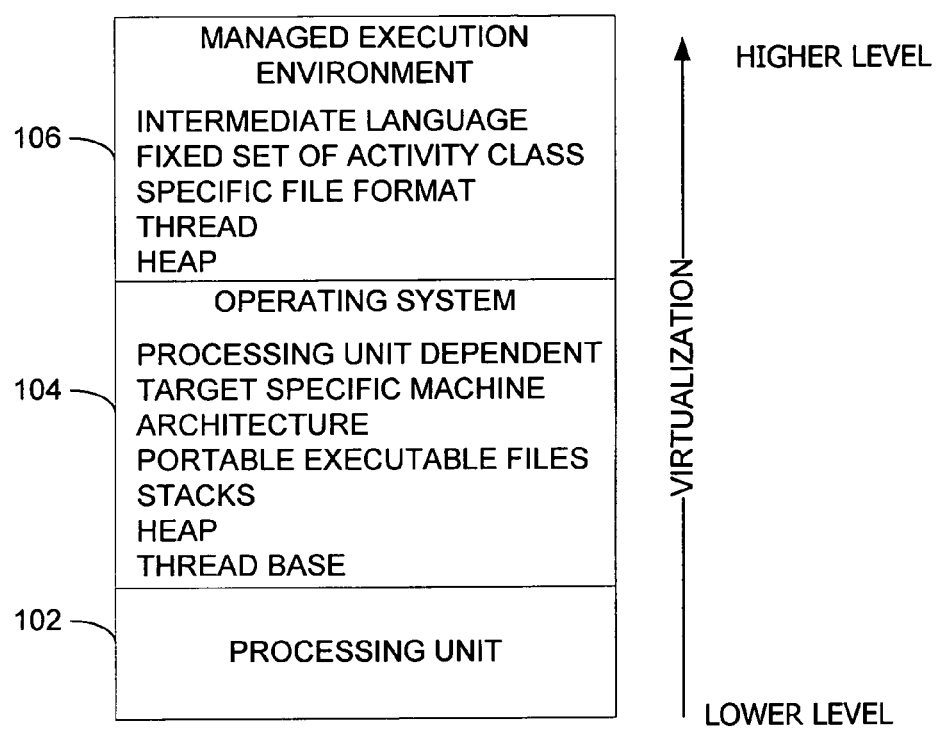
FIG. 1 is a block diagram illustrating an existing programming paradigm.

Referring first to FIG. 1, a block diagram illustrates an existing programming paradigm for designing programs for process-centric activities, such as a workflow. For example, the diagram shows a three-level virtualization model of existing program paradigm with a level of a managed execution environment being the highest level and a processing unit being the lowest level. In this programming design system, even at the managed execution environment level, programs, especially process-centric programs handling workflow processes, lack the ability and efficiency to accommodate complex interactions between processes in a workflow.

It is known by those skilled in the art that certain constraints are associated with designing software or application programs. In this example, in writing an operating system software program 104, the programming codes or routines are dependent on the type or configuration of processing units 102, being specific to the type of computing architecture (e.g., IBM® compatible, APPLE® computers, or other systems), or other constraints. In addition, programming languages typically need to accurately identify and utilize data structures such as stacks, heap, thread base, or other hardware-specific structures for the operating system 104 to function properly.

In dealing with complex workflow processes, existing applications use a concept of a managed execution environment 106 (e.g., a runtime environment where programs may share functions or common object-oriented classes) in which programs written one programming language may call functions in other programs written in a different programming language. In such execution environment, these programs in different programming languages are compiled to an intermediate language such that the managed execution environment 106 may expose parameters, arguments, or schemas or functions to the different programs so that the programs may interact with one another.

While this execution environment 106 creates a common communication environment between programs, the execution environment 106 includes various strict requirements that may not be suitable for handling the complexity and capability of process-centric programs. For example, the execution environment 106 requires programs be confirmed to a specific file format. The execution environment 106 also requires that functions or operations in the programs use a fixed set of functions or a class of functions defined by the execution environment 106.

Figure 2:
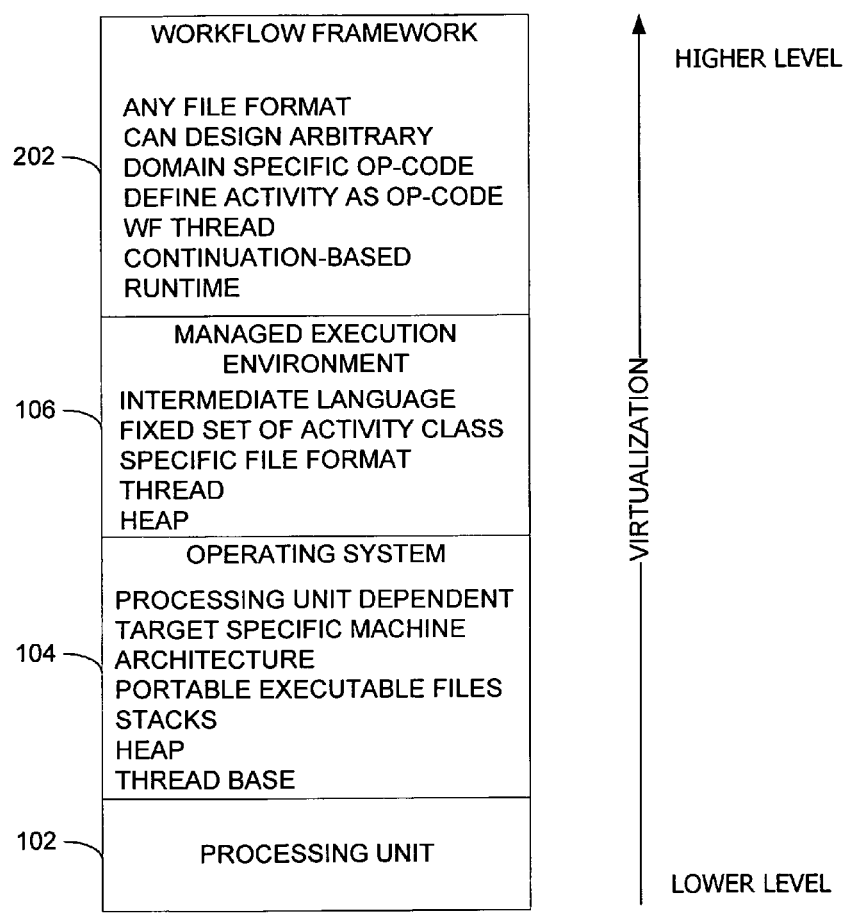
FIG. 2 is an exemplary block diagram illustrating a virtualization of a workflow design framework according to an embodiment of the invention.

Embodiments of the invention build on an extensible foundation or framework 202 in FIG. 2 to overcome the shortcomings of existing programming model. By allowing programs written in any programming language and composed in any file format, aspects of the invention enable program developers to design programs with specific functions without compromising its functionalities and specifics. By defining activities, such as workflow tasks or processes, as the base class to be executed in the workflow framework, developers can easily and efficiently build domain specific (e.g., specific execution environments such as programs in the healthcare industrial, financial industry, or the like) operation codes (hereinafter "op-code") without adhering to the rigid, hard-coded, inflexible, and the fixed set of functions or activities classes in the existing execution environment. In addition, the workflow foundation embodying aspects of the invention is a continuation based runtime layered on top of any existing framework (e.g., either a managed execution environment, operating system environment, or hardware processing unit level).

Aspects of the invention free the constraint of defining activities in a particular file format by enabling workflow designs in any fashion or representation (e.g., a flow chart, a diagram, a numbered description, or the like) as long as activities in the workflow can be constructed from the representation of the workflow designs.

Figure 3:
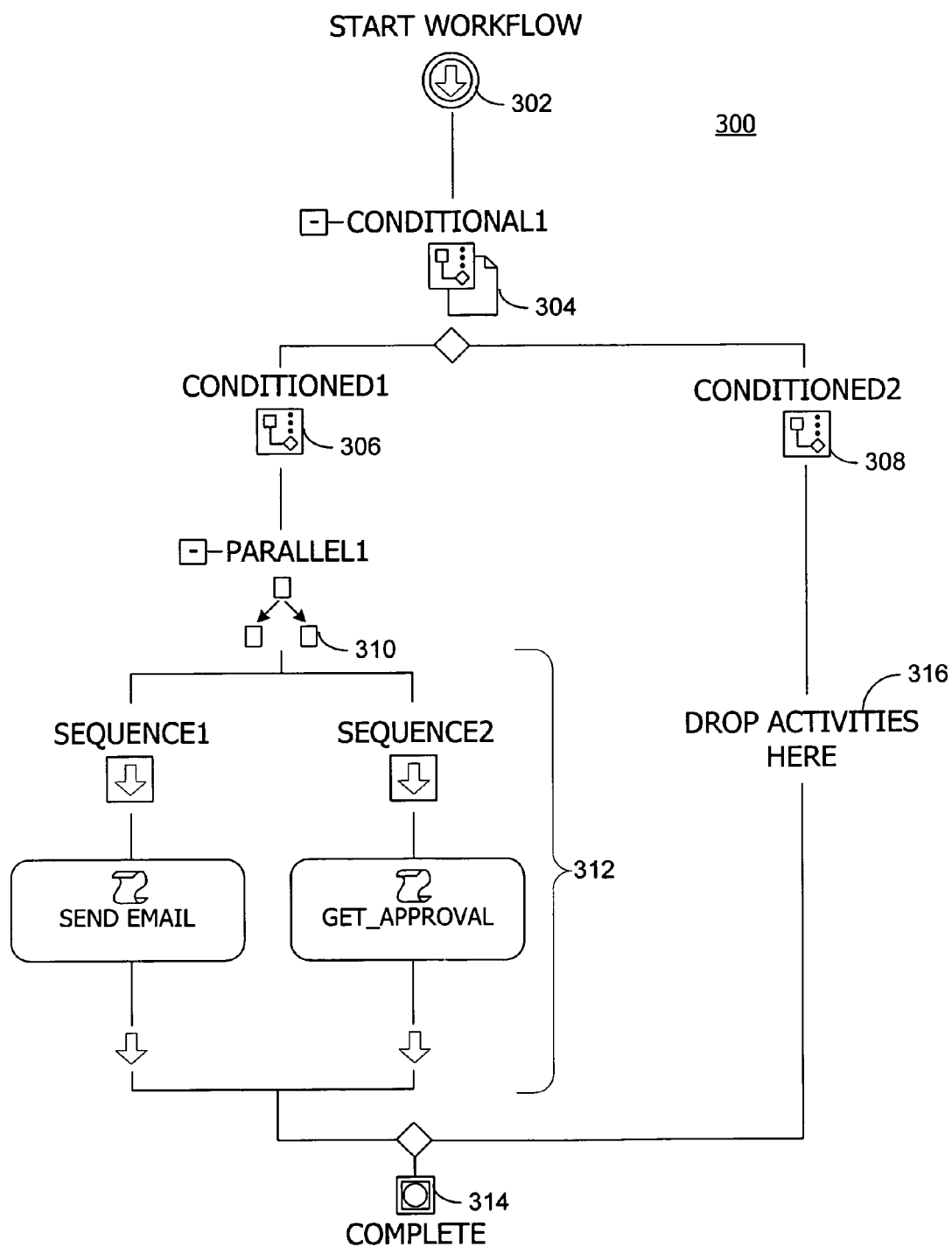
FIG. 3 is an exemplary diagram illustrating an exemplary workflow according to an embodiment of the invention.

FIG. 3 illustrates a simplistic view of a workflow 300 according to an embodiment of the invention. For example, the workflow 300 may be a workflow for processing a purchase order, and this purchase order workflow 300 may include processes or activities such as receive a purchase order, send confirmation to a customer, approve the purchase order by a manager, or the like. Further, these activities may be sequenced such that some may be performed at the same time as others, while some others may be performed only up on the completion of other activities.

The workflow 300 may start from a starting point 302. For example, the starting point 302 for a purchase-order workflow may be receiving an order from a customer. The workflow 300 may also include a conditional statement 304 (such as an "IF statement" or a "WHILE statement"), and it can be subdivided into additional conditional statements 306 and 308. The workflow 300 may also include a parallel structure 310, which further includes one or more activities 312. For example, the parallel structure 310 may indicate that activities such as checking the inventory and updating checking available shipper may be processed in parallel. In the example shown, activities such as "Send E-mail" and "Get Approval" may be processed in parallel. In a box "drop activities here" 316 indicates that a user may further add or supplement more activities into the workflow 300. To complete the workflow 300, the processes or activities will conclude in a complete step or point 314.

Figure 5:
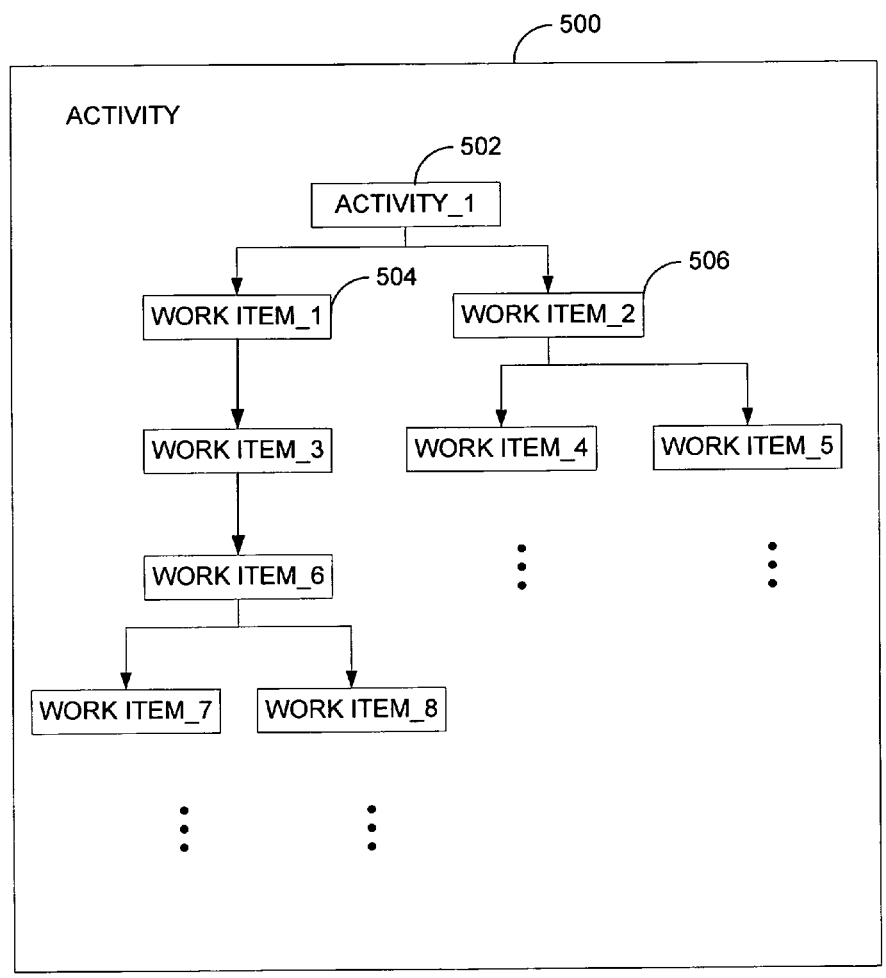
FIG. 5 is a diagram illustrating a hierarchical structure of a workflow activity according to an embodiment of the invention.

In one embodiment, the activities may be arranged hierarchically in a tree structure (see FIG. 5) 500. For example, an activity method is in a root node 502 with two children or leaf nodes 504 and 506. The activity methods in the children nodes 504 and 506 (e.g., work item_1 and work item_2, respectively) may be executed according to the hierarchical structure. In addition, the children nodes 504 and 506 may also include other children nodes having respective work items to be executed.

In another embodiment, activities include one or more of the following types: a simple activity, container activity and root activity. In this embodiment, there is one root activity in the model, and none or any quantity of simple activities or container activities inside the root activity. A container activity may include simple or container activities. The entire workflow process may be used as an activity to build higher-order workflow processes. Further, an activity may be interruptible or non-interruptible. A non-interruptible composite activity does not include interruptible activities. A non-interruptible activity lacks services that would cause the activity to block. In addition, activities may be primitive activities or grouped into a composite activity. A primitive or basic activity has no substructure (e.g., child activities), and thus is a leaf node in a tree structure. A composite activity contains substructure (e.g., it is the parent of one or more child activities).

Moreover, in executing activities and the work items included in the activities, the workflow framework defines an execution context or environment that is a scope or boundary for each of the work items. This scope or boundary includes and exposes information (e.g., in the form of data, metadata, or the like) such as the shared data or resources to be accessed by the work items, associated properties, handlers, constraints and interactions between autonomous agents. These scopes may be structured hierarchically. Also, each activity may be configured by a user code in any programming language that supports the underlying managed framework. For example, the user code may represent business or application logic or rules written in a specific domain or execution environment. Each activity may support pre-interception hooks and post-interception hooks into execution in the user code. Each activity has associated runtime execution semantics and behavior (e.g., state management, transactions, event handling and exception handling). Activities may share state or resources with other activities.

Figure 4:
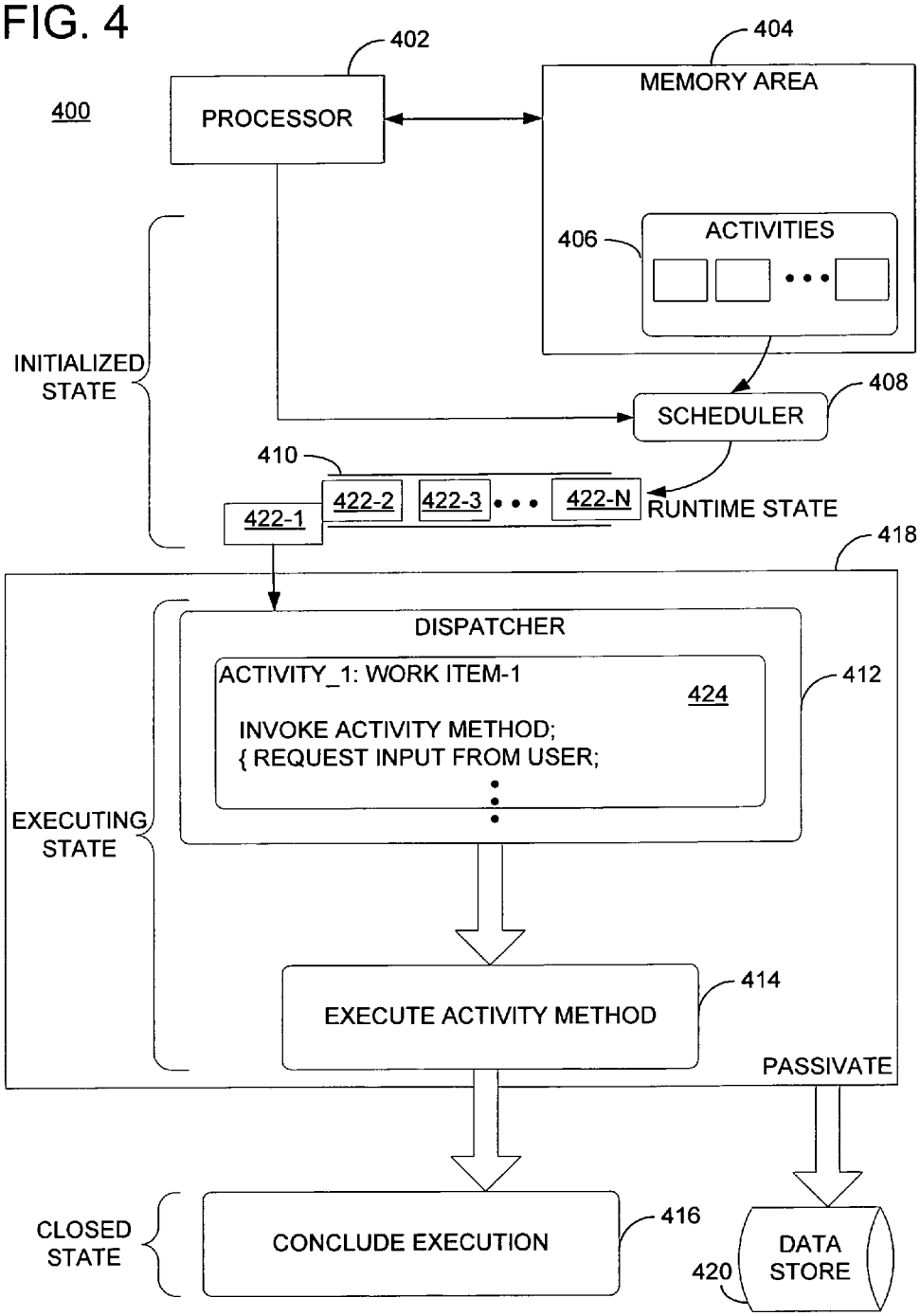
FIG. 4 is a diagram illustrating a system for processing workflow activities according to an embodiment of the invention.

FIG. 4 is a diagram illustrating a system 400 for processing workflow activities according to an embodiment of the invention. The system 400 includes a processor 402, which may be a processing unit or a collection of processing units. The system 400 also includes a memory area 404 for storing data accessible by the processor 402. In embodiment, the system 400 may be a computer having one or more processors or processing units (e.g., processor 402) and a system memory (e.g., memory area 404) and having at least other components known to those skilled in the art coupling various system components including the system memory to the processor 402.

In one example, the memory area 404 may include computer readable media, either volatile, nonvolatile, removable, or non-removable media, implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the system 400. The memory 404 may also include communication media embodying computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In example, the memory area 404 stores a plurality of activities 406 for processing in a workflow (e.g., the workflow 300). Each of the plurality of activities 406 includes one or more work items, and the work items may be organized in a hierarchical structure such as a tree structure (see FIG. 5). In processing the plurality of activities 406, the processor 402 accesses or executes a scheduler 408, which is configured to set up an organized set of activities.

For example, the processor 408 accesses the work items in the plurality of activities 406 via a component or a set of computer-executable instructions such as the scheduler 408 to enqueue the work items 422 to a queue 410. A dispatcher 412, accessible by the processor 402, dispatches the work items 422 for execution. For example, a work item 422-1 may include an activity method 424, routine, or a collection of codes for performing a function of "requesting input from a user". One or more other activity methods, routines, or codes may be included in each of the work items 422 without departing from the scope of the invention.

Once the work items 422 are dispatched by the dispatcher 412, the processor 402 executes each of the methods 424 in the work items 422 at 414. In the example of work item 422-1, the processor 402 may provide a user via a user interface (UI) to input the requested information or data. In another embodiment, the processor 402 may connect to or access an external data source for requesting input from the user. Upon completion of the activity method 424, the processor 402 concludes execution of the work items 422 at 416. In one embodiment, the processor 402 passivates the executing state of work items at 418 to a data store 420.

Figure 6:
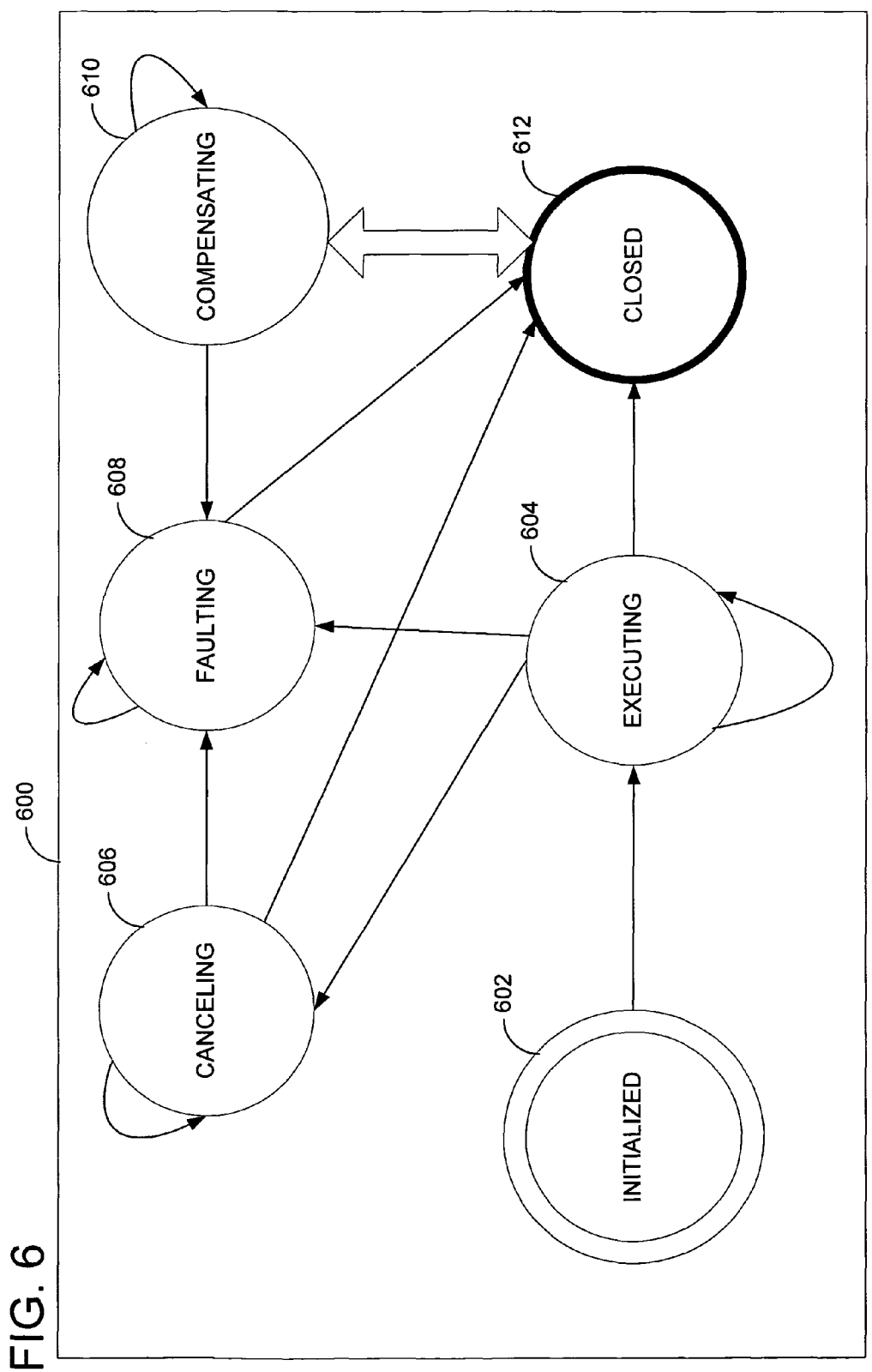
FIG. 6 is a diagram illustrating an exemplary state automaton describing processing states of work items associated with an activity according to an embodiment of the invention.

In another embodiment, the processor 402 executes the work items 422 according to a state automaton, such as the automaton shown in FIG. 6, which is a diagram illustrating an exemplary state automaton 600 describing processing states of work items associated with an activity according to an embodiment of the invention. In one example, the state automaton 600 may include an initialized state, an executing state, and a closed state (as shown in FIG. 4). In another embodiment, the state automaton 600 includes an initialized state 602, an executing state 604, a cancelling state 606, a faulting state 608, a compensating state 610, and a closed state 612.

For example, the state automaton 600 describes a process flow of execution of work items (e.g., work items 422) in a workflow activity. The work item 422-1, as illustrated in FIG. 4, is first initialized when it is enqueued in the queue 410. The work item 422-1 is next dequeued to the dispatcher 412 before being executed in the executing state (e.g., executing state 604 in FIG. 6). Depending on the parameters or conditions during the execution of the work item 422-1, the work item 422-1 may proceed to the canceling state 606 or the faulting state 608. In one embodiment, the work item 422-1 may proceed from the canceling state 606 to the faulting state 608. In an alternative embodiment, the compensating state 610 describes a set of operations or functions to be performed when faulting or exception has occurred. For example, suppose an exception occurs during the execution of a work item (e.g., work item 422-1), such as a parameter for a function is missing. The system 400 transitions the work item 422-1 to the faulting state 608. In doing so, the system 400 also performs garbage collection (e.g., removing previously executed portion of the operations from cache or memory, reset parameter values, or the like) operations in the compensating state 610 before transitioning the work item 422-1 to the closed state 612.

In one embodiment, programs designed according to the workflow framework embodying aspects of the invention may be visited by any number of threads from lower levels (e.g., a managed execution environment, such as a common language runtime (CLR) or OS level). In another embodiment, a scheduler (e.g., scheduler 408) may use a dedicated CLR thread for a given run or execution of activities.

Furthermore, an execution handler for an activity corresponding to an activity may be viewed as a thread under the workflow framework (WF) embodying aspects of the invention. As such, WF threads interleave at wait points or upon explicit out of order scheduling in an asynchronous fashion by a parent composite activity.

Figure 7A:
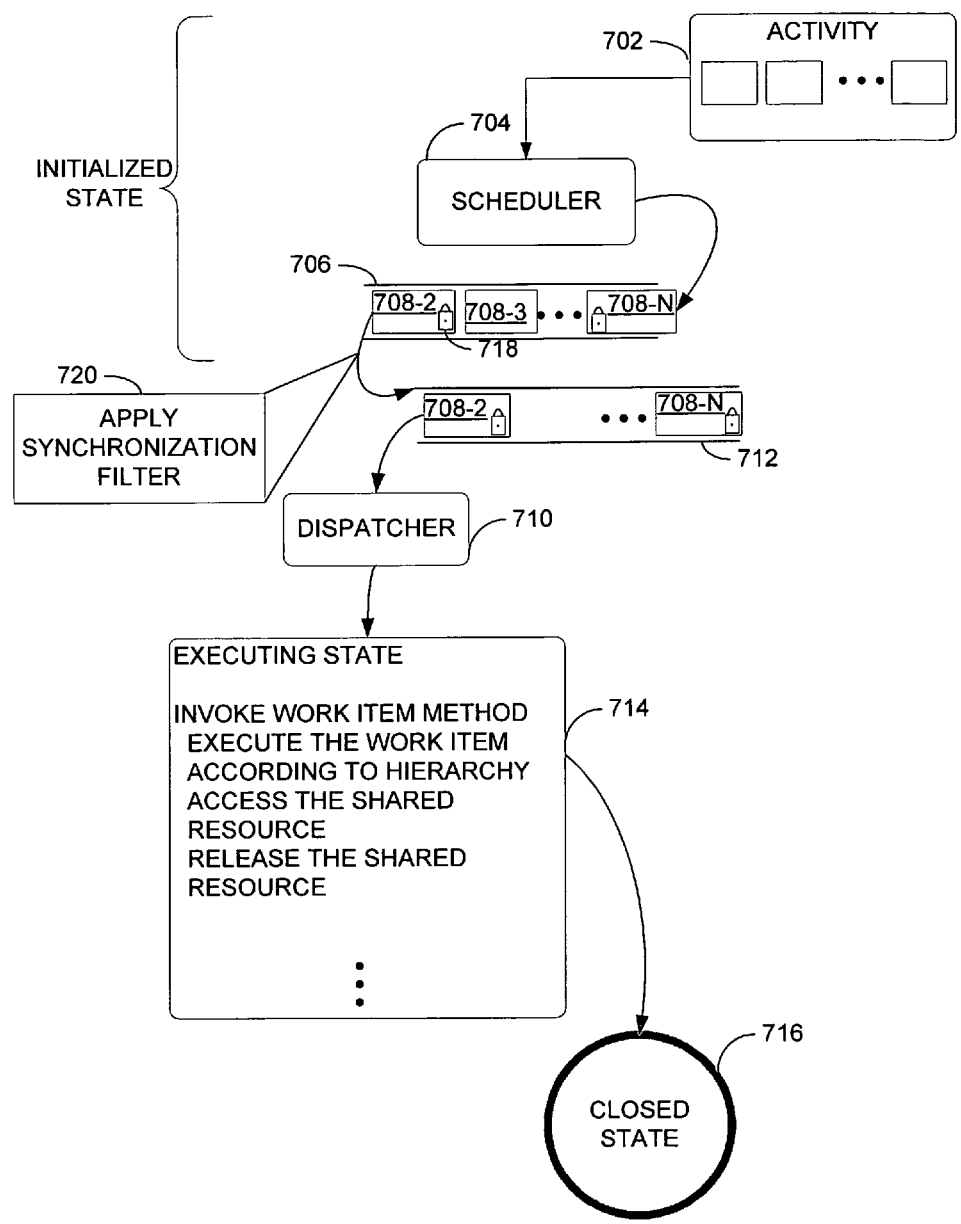
FIG. 7A is a block diagram illustrating a synchronous execution of work items in an activity in a workflow according to an embodiment of the invention.

Referring now to FIG. 7A, a block diagram illustrates a synchronous execution of work items in an activity in a workflow according to an embodiment of the invention. In one embodiment, the synchronous execution of work items enable an interleave execution of threads associated with the workflow. In one embodiment, the workflow defines a SynchronizationScopeActivity to synchronize access to the shared state within an instance of an activity as illustrated in Appendix A. For example, suppose two activities in the workflow wish to access a directory in a data store to perform two different operations. In this example, $Activity_1$ may wish to access files in the directory before updating information in the read files. At the same time, $Activity_2$ may wish to modify the same set of files accessed by the $Activity_1$. As such, accesses to shared resources by $Activity_1$ and $Activity_2$ need to be synchronized and managed. Appendix A illustrates a set of operations SynchronizationScope showing an exemplary implementation of synchronization or interleaving of shared state across threads in a declarative manner.

Existing systems typically perform such synchronization by relying on access locks or other methods provided by an operating system (OS). Such OS locks, while providing basic functionalities to achieve the desired purpose, are hard-coded, inflexible, and unsuitable for the extensible workflow foundation or framework. In addition, threads in the OS level commonly include context switches associated with the OS locks (e.g., recorded or identified memory addresses, previous memory addresses, stack allocations, or the like). In addition, the OS locks do not survive the passivation process because all of the pointers, stacks, etc., associated with the OS locks fail to restore the values previously assigned in the locks before passivation. Furthermore, while workflows may execute on different machines during their lifetime, OS locks are valid only for the machine that they were created on.

Embodiments of the invention assign synchronization handles 718 to work items within the activity to ensure that execution threads synchronously access the shared resources without conflict or deadlock. Aspects of the invention enable developers to design virtual and weightless threads on top of threads of a physical or managed execution environment. In another embodiment, the execution threads are lightweight for not attaching or associating any physical or hardware references. As such, the execution threads survive passivation cycles or can be persisted after being stored in a data store.

For example, suppose a program includes a callback function, and, during the execution of the callback function, it is determined that the program needs to be passivated to a data store. Existing model and programming languages require all parameters associated with the executing state of the program be saved as an object. The state of the program can be restored at a later point in time from the object. The object, however, usually includes threads that have hard-coded association with hardware context or settings where the program is executed. Embodiments of the invention overcome such dependency.

Referring again to FIG. 7A, a diagram illustrates synchronous execution of threads when more than one threads attempt to access a shared resource. Initially, a collection 902 of work items in an activity is scheduled to be processed. In one embodiment, the work items in the activity may be organized in a tree structure, such as the activity 502 shown in FIG. 5. A scheduler 704 accesses the collection 702 of work items and enqueues the work items in a scheduler queue 706 to be processed. In one embodiment, the synchronization handle 718 is assigned to each of the activities in the scheduler queue 906, indicating that a particular shared resource is to be accessed by the activity. For example, a work item 708-2 and work item 708-N access a shared resource (e.g., a memory location). As such, both work items 708-2 and 708-N include synchronization handles 718. On the other hand, a work item 708-3, which does not access a shared resource with other work items, does not include a synchronization handle 718, and that the particular shared resource being shared by one or more of the work items.

In one embodiment, the synchronization handle 718 is a string token, akin to a named mutual exclusion object ("mutex"). In one embodiment, a synchronization filter 720 is applied to the work items with the assigned synchronization handle 718.

Figure 9:
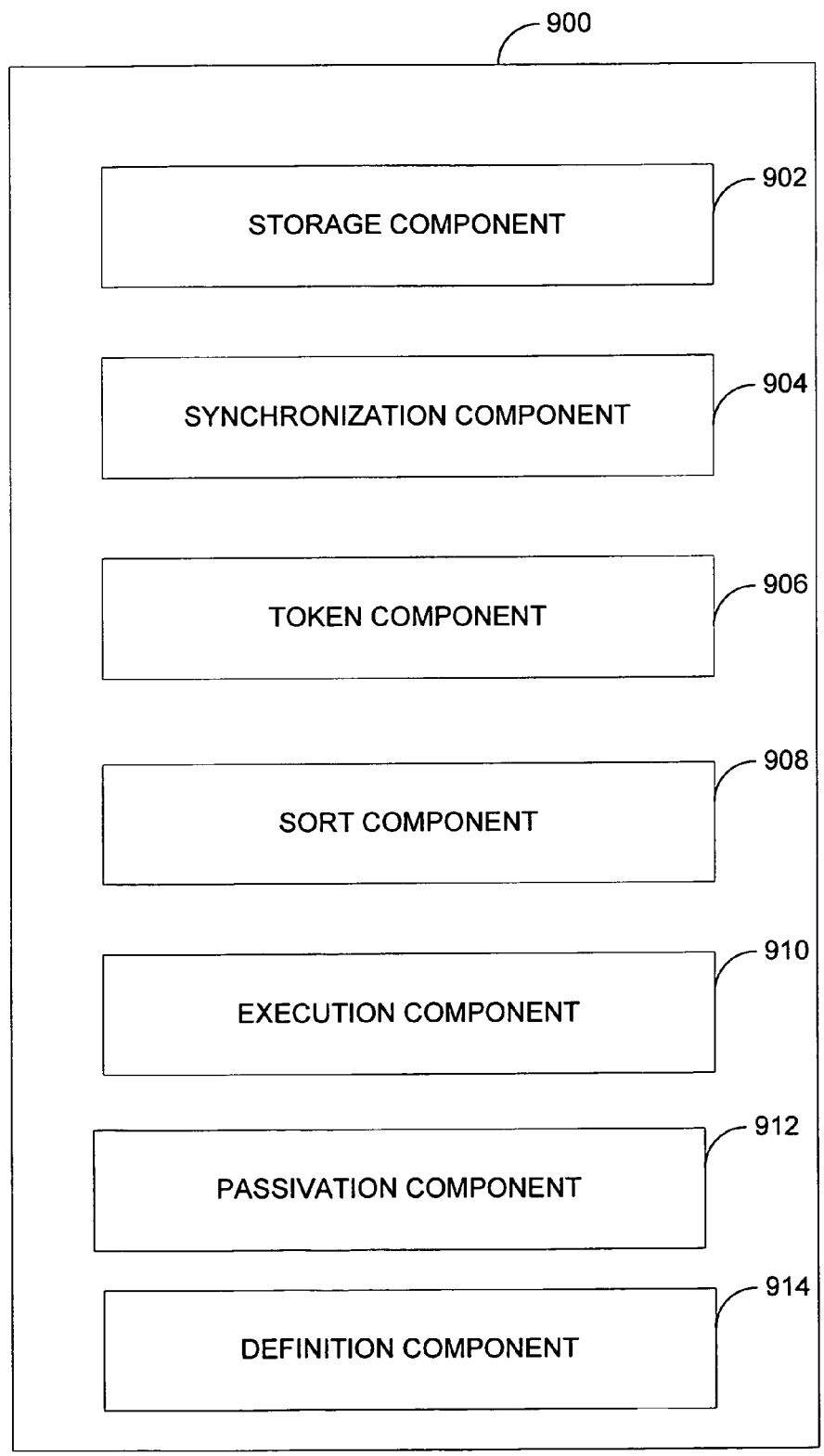
FIG. 9 is a block diagram illustrating an exemplary computer-readable medium on which aspects of the invention may be stored.

Once the synchronization handle 718 is assigned, a token value is computed for each of the work items based on the assigned synchronization handle 718. In the embodiments where the work items are part of a hierarchical structure (e.g., a tree structure) in the activity, the token value is computed based on the assigned synchronization handle 718 and a location of the work item in the hierarchy in the activity. In one embodiment, a token component (as shown in FIG. 9) or a lock manager monitors or manages the synchronization handle 718 and the shared resources for each of the work items in the activity tree.

The work items with the computed token values are next sorted in a synchronization queue 712 based on the computed token value associated with each of the work items. In one embodiment, a function AcquireLock may be used in sorting and determining whether accesses to the shared resource are allowed. For example, as illustrated in FIG. 7A, because of the computed token values, the AcquireLock function sorts the work item 708-2 in a position preceding the work item 708-N in the synchronization queue 712.

Figure 7B:
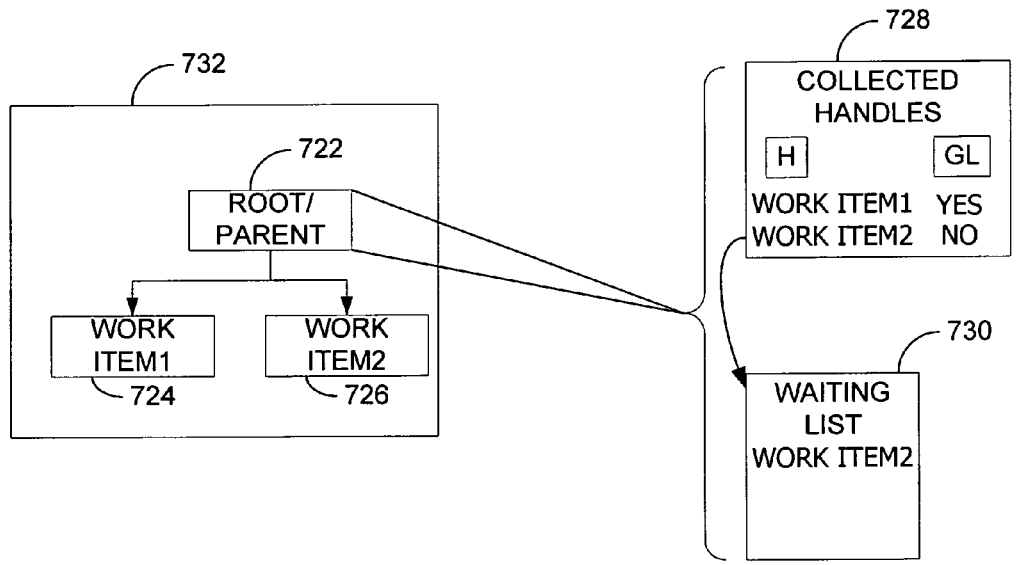
FIG. 7B is a diagram illustrating sorting of a synchronization queue according to an embodiment of the invention.

In one embodiment, the AcquireLock function performs the sorting of the work items in the synchronization queue 712 by first collecting all the synchronization handles 718 belonging to the same activity. As such, deadlocks do not occur. FIG. 7B is a diagram illustrating sorting of the synchronization queue 712 by the AcquireLock function according to an embodiment of the invention. For example, a simplistic activity tree 732 includes a root/parent node 722 and two children nodes 724 and 726, and each includes a work $item_1$ and a work $item_2$, respectively.

As discussed above, some of the work items in the activity tree may not include a synchronization handle. As such, if any work item in the children/leaf node of the activity tree does not have a synchronization handle, the AcquireLock function would not proceed further in the hierarchical structure of the activity tree. In one embodiment, during the sorting, the AcquireLock function also removes duplicate work items to avoid any deadlocks in the synchronization queue 712.

In continuing traversing through the nodes of the activity tree, the AcquireLock function next attempts to identify the work item at the root or parent node of the activity tree, such as the root node 722. After encountering the root or parent node, the AcquireLock function determines whether a list or dictionary of collected handles for the root or parent node 722 includes all the synchronization handles 718 for all of its children.

In FIG. 7B, a collected handles list 728 includes information such as "H" (denoting synchronization handles) and "GL" (denoting GrantedLocks). As illustrated, the list 728 indicates that the synchronization handle 718 assigned to the child node 724 has been collected and that the root node 722 is the holder of the synchronization handle 718 (i.e., permission to access a particular shared resource) for the work $item_1$ of the child node 724.

On the other hand, the list 728 also indicates that the root node 722 has the synchronization handle 718 for the child node 726, but the root node 722 is not the holder of the synchronization handle 718 (i.e., the root node 722 does not have access to the share resource). As such, the work $item_2$ of the child node 726 is added to a waiting list 730 and the AcquireLock function would perform another iteration of the process to ensure the root node 722 obtains the synchronization handle 718 for the child node 726.

Once the AcquireLock function sorts the synchronization queue 712 according to the description above, a dispatcher 710 dispatches the work items (e.g., 708-2) in the synchronization queue 712 to be executed in the executing state in which activity methods or functions in the work items are processed. As such, the work items are sequentially executed from the synchronization queue to serialize access to the particular shared resource and effect a synchronous execution of the threads associated with the work items.

Figure 8:
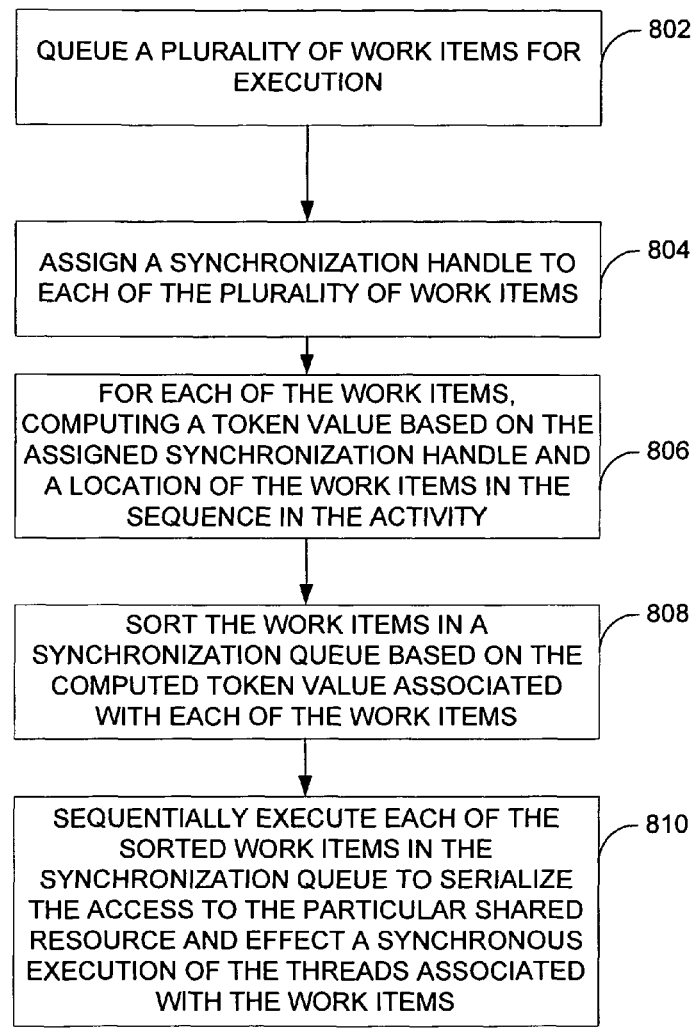
FIG. 8 is a flow diagram illustrating a method for synchronously executing activities accessing a particular shared resource according to an embodiment of the invention.

Referring now to FIG. 8, a flow diagram illustrating a method for synchronously executing activities access a particular shared resource according to an embodiment of the invention. In one example, the method illustrated in FIG. 8 may be performed by computer-executable components included in a computer-readable medium 900 illustrated in FIG. 9. For example, a storage component 902 stores a plurality of work items in a queue (e.g., a scheduler queue) or queues the plurality of work items for execution at 802. The one or more of the plurality of work items are associated with an activity in a workflow, and one or more of the plurality of work items being organized in a tree structure or in other hierarchical structure in the activity. Each of the work items is associated with a thread.

At 804, a synchronization component 904 assigns a synchronization handle to each of the plurality of work items in the queue. The synchronization handle indicates the particular shared resource to be accessed by the plurality of work items. At 806, a token component 906 computes a token value for each of the work items based on the assigned synchronization handle and a location of the work items in the tree structure in the activity. A sort component 908 sorts the work items in a synchronization queue based on the token value associated with each of the work items at 808. At 810, an execution component 910 executes each of the sorted work items in the synchronization queue to serialize the access to the particular shared resource and effect a synchronous execution of the threads associated with the workflow.

In one embodiment, the computer-readable medium 900 further includes a definition component 912 for declaratively defining the assigned synchronization handle for each of the work items by exposing properties of the synchronization handle for each of the work items. In yet another alternative embodiment, the computer-readable medium 900 includes a passivation component 914 for passivating the synchronization queue with the work items and the associated token values to a data store.

Although described in connection with an exemplary computing system environment, such as the system 400 in FIG. 4, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, the system 400 executes computer-executable instructions such as those illustrated in the figures, such as FIG. 7, to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

```
<myActivities:Parallel x:Name="pxxx"
  xmlns:myActivities="http://schemas.com/myActivities"
  xmlns:x="http://schemas.microsoft.com/winfx/2006/xaml"
  xmlns="http://schemas.microsoft.com/winfx/2006/xaml/workflow">
  <SynchronizationScopeActivity x:Name="s1" SynchronizationHandles="a">
    <myActivities:Parallel x:Name="p1">
      <SynchronizationScopeActivity x:Name="s2"
        SynchronizationHandles="a">
```

APPENDIX A-continued

```
        <myActivities:WriteLine x:Name="w3" Text="One"/>
        <myActivities:WriteLine x:Name="w4" Text="Two"/>
      </SynchronizationScopeActivity>
      <SynchronizationScopeActivity x:Name="s3"
    SynchronizationHandles="b">
        <myActivities:WriteLine x:Name="w5" Text="Three"/>
        <myActivities:WriteLine x:Name="w6" Text="Four"/>
      </SynchronizationScopeActivity>
    </myActivities:Parallel>
  </SynchronizationScopeActivity>
  <SynchronizationScopeActivity x:Name="s4" SynchronizationHandles=
"b">
    <myActivities:Parallel x:Name="p2">
      <SynchronizationScopeActivity x:Name="s5"
    SynchronizationHandles="b">
        <myActivities:WriteLine x:Name="w9" Text="Five"/>
        <myActivities:WriteLine x:Name="w10" Text="Six"/>
      </SynchronizationScopeActivity>
      <SynchronizationScopeActivity x:Name="s6"
    SynchronizationHandles="a">
        <myActivities:WriteLine x:Name="w11" Text="Seven"/>
        <myActivities:WriteLine x:Name="w12" Text="Eight"/>
      </SynchronizationScopeActivity>
    </myActivities:Parallel>
  </SynchronizationScopeActivity>
</myActivities:Parallel>
```

APPENDIX B

In yet another example, the following illustrates an exemplary sequence of implementing asynchronous thread execution according to an embodiment of the invention.

1) Synchronization Filter is applied to all activities that have [SupportsSynchronization] attribute.
2) RootActivity and all of the synch scopes keep a Dictionary of {handle, GrantedLock}. Each GrantedLock structure keeps the activity and the WaitList. GrantedLock is serializable and so is the Dictionary such that both may survive the passivation.
3) Each synch scope is a lock manager for its children synch scopes. Root activity is the default lock manager. A lock manager is responsible for granting the locks for the children synch scope and also to keep a wait list of children synch scopes which could not get locks.
4) There is a hierarchy of WF threads of execution (e.g., based on the hierarchy of the activity) and similarly hierarchy of lock managers/synch scopes.
5) SynchronizationFilter in its execute method, calls AcquireLocks passing itself as a callback
6) If AcquireLock returns true, the activity execution proceeds. Otherwise, it remains in Executing state.
7) Within the AcquireLock:
   a. The activity collects the synch handles for itself and *all* its children. If any child does not have synch handles, we stop going further in the hierarchy. It then removes duplicates and sorts all the handles. This is to avoid any deadlocks
   b. If there are no handles found, AcquireLock returns true. The execution of the synch scope can proceed since it is not synchronizing anything (no-op).
   c. AcquireLock keeps walking the parent hierarchy looking for a parent which is a synch scope or until it finds the root. At each step when it encounters a synch scope parent, for each of the handles it has collected, it checks if the parent's grantedlocks dictionary has the handle. If not, adds itself as the activity for the given handle to which the lock has been granted. If it already has the handle and it is not the holder, it adds itself to the wait list. At any point it has at least added to one of the wait lists, AcquireLock returns false. If any synch scope parent has non-empty list of handles, we break and return true since the parent would have already acquired all the locks. Remember, parent's synch filter got executed before the child always.
8) The synch filter subscribes for the activity to the closed state. Once, it does proceed to the closed state, the filter calls ReleaseLock.
9) Within the ReleaseLock:
   a. Walk the parent chain, for each step, for each handles, collect the activities that are waiting on a given handle.
   b. For all waiting activities, try to acquire locks again. For those for which can get the locks, invoke the filter callback.

What is claimed is:

1. A system for implementing synchronization among execution threads in a workflow, said system comprising:
   a memory area for storing a plurality of work items in a scheduler queue, said one or more of the plurality of work items being organized hierarchically in an activity and being associated with the activity in a workflow, each of the work items being associated with a thread of execution;
   a processor configured to execute computer-executable instructions for:
      assigning a synchronization handle to each of the plurality of work items in the scheduler queue, said synchronization handle indicating a particular shared resource to be accessed by the work item, said particular shared resource being accessed by one or more of the work items, such that two or more work items in the scheduler queue have identical synchronization handles;
      organizing each of the work items with the assigned synchronization handle as a virtual execution thread comprised of said work items, each of the work items in the virtual execution thread having an assigned synchronization handle identical to the synchronization handles assigned to the other work items in the virtual execution thread;
      for each of the work items, computing a token value based on the assigned synchronization handle and a location of the work item in the hierarchy of work items in the activity;
      sorting the work items into a synchronization queue based on the computed token value associated with each of the work items;
      sequentially executing the virtual execution thread of each of the sorted work items in the synchronization queue to serialize access to the particular shared resource and effect a synchronous execution of the virtual execution threads associated with the work items;
      determining, while sequentially executing the virtual execution thread of each of the sorted work items in the synchronization queue, that the executing virtual execution thread requires passivation; and
      upon determining that the executing virtual execution thread requires passivation, passivating the synchronization queue by storing the work items and the associated token values to a data store.

2. The system of claim 1, wherein the processor is further configured to declaratively define the assigned synchronization handle for each of the work items by exposing properties of the synchronization handle for each of the work items.

3. The system of claim 1, wherein the assigned synchronization handle of each of the work items defines a thread scope associated with each of the work items.

4. The system of claim 1, wherein the hierarchy in the activity is a tree structure, and wherein the processor is configured to execute computer-executable instructions for sorting the work items based on the location in the tree structure.

5. The system of claim 1, wherein the processor is configured to execute the work items by transitioning the work items to an executing state according to a state automaton associated with processing the workflow.

6. A method for synchronized execution of activities accessing a particular shared resource in a workflow, said method comprising:
   queuing a plurality of work items for execution, said one or more of the plurality of work items being organized in a sequence in an activity and being associated with the activity in a workflow, said each of the work items being associated with a thread of execution;
   assigning a synchronization handle to each of the plurality of work items as a virtual execution thread, said synchronization handle indicating the particular shared resource to be accessed by the plurality of work items, said particular shared resource being accessed by one or more of the work items, such that two or more work items in the queue have identical synchronization handles;
   organizing each of the work items with the assigned synchronization handle as a virtual execution thread, each of the work items in the virtual execution thread having an assigned synchronization handle identical to the synchronization handles assigned to the other work items in the virtual execution thread;
   for each of the work items, computing a token value based on the assigned synchronization handle and a location of the work items in the sequence in the activity;
   sorting the work items in a synchronization queue based on the computed token value associated with each of the work items;
   sequentially executing each of the sorted work items in the synchronization queue to serialize the access to the particular shared resource and effect a synchronous execution of the virtual execution threads associated with the work items;
   determining, while sequentially executing each of the sorted work items in the synchronization queue, that the executing virtual execution thread requires passivation; and
   upon determining that the executing virtual execution thread requires passivation, passivating the synchronization queue by storing the work items and the associated token values to a data store.

7. The method of claim 6, further comprising declaratively defining the assigned synchronization handle for each of the work items by exposing properties of the synchronization handle for each of the work items.

8. The method of claim 6, wherein assigning the synchronization handle comprises assigning a string token.

9. The method of claim 6, wherein assigning the synchronization handle comprises defining a thread scope associated with each of the work items.

10. The method of claim 6, wherein the sequence in the activity corresponds to a sequence for traversing a tree structure, and wherein sorting comprises arranging the work items based on the location in the tree structure.

11. The method of claim 6, wherein executing comprises executing the work items by transitioning to an executing state according to a state automaton associated with processing the workflow.

12. The method of claim 6, wherein the queuing, assigning, computing, sorting, and executing are performed by computer-executable instructions executed by a processor, and wherein the computer-executable instructions are stored on one or more computer-readable storage media.

13. One or more tangible computer-readable storage media, excluding signals and carrier waves, having computer-executable components for synchronously executing activities, said computer-executable components comprising:
   a storage component for storing a plurality of work items in a queue, said one or more of the plurality of work items being associated with an activity in a workflow, said one or more of the plurality of work items being organized in a tree structure in the activity, said each of the work items being associated with a thread of execution;
   a synchronization component for assigning a synchronization handle to each of the plurality of work items in the queue, such that two or more work items in the queue have identical synchronization handles, said synchronization component organizing each of the plurality of work items with the assigned synchronization handle as a virtual execution thread, said synchronization handle indicating the particular shared resource to be accessed by the plurality of work items, said particular shared resource being shared by one or more of the work items, wherein each of the work items in the virtual execution thread has an assigned synchronization handle identical to the synchronization handles assigned to the other work items in the virtual execution thread;
   a token component for computing a token value for each of the work items based on the assigned synchronization handle and a location of the work items in the tree structure of work items in the activity;
   a sort component for sorting the work items in a synchronization queue based on the computed token value associated with each of the work items;
   an execution component for executing each of the sorted work items in the synchronization queue to serialize the access to the particular shared resource and effect a synchronous execution of the plurality of work items as the virtual execution threads associated with the workflow; and
   a passivation component for, during execution of the sorted work items in the synchronization queue by the execution component, passivating the synchronization queue with the work items and the associated token values to a data store by storing the synchronization queue with the work items, the associated token values, and the state of execution in the data store.

14. The tangible computer-readable storage media of claim 13, further comprising a definition component for declaratively defining the assigned synchronization handle for each of the work items by exposing properties of the synchronization handle for each of the work items.

15. The tangible computer-readable storage media of claim 13, wherein the synchronization component comprises defining a thread scope associated with each of the work items.

16. The tangible computer-readable storage media of claim 13, wherein the execution component comprises executing the work items by transitioning to an executing state according to a state automaton associated with processing the workflow.

* * * * *